Dec. 17, 1968  C. H. HARTMANN  3,417,238
GAS CHROMATOGRAPHIC DETECTOR UTILIZING RADIOACTIVITY
Filed April 6, 1965  2 Sheets-Sheet 2

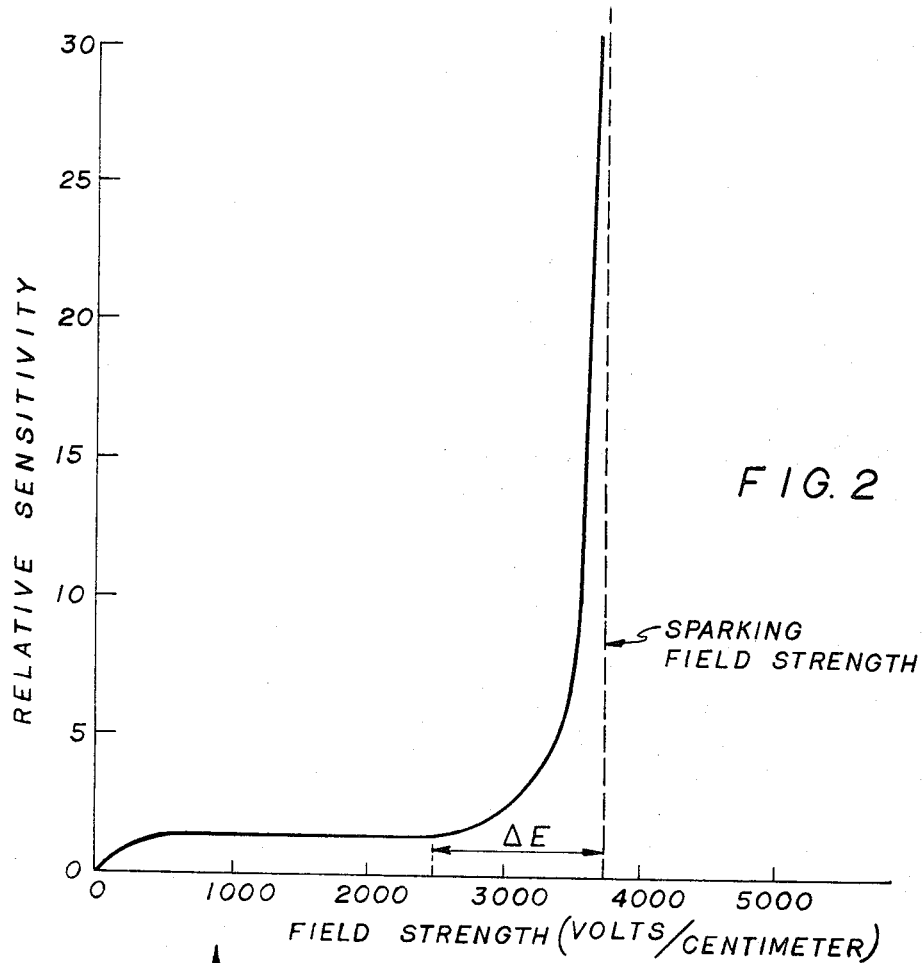
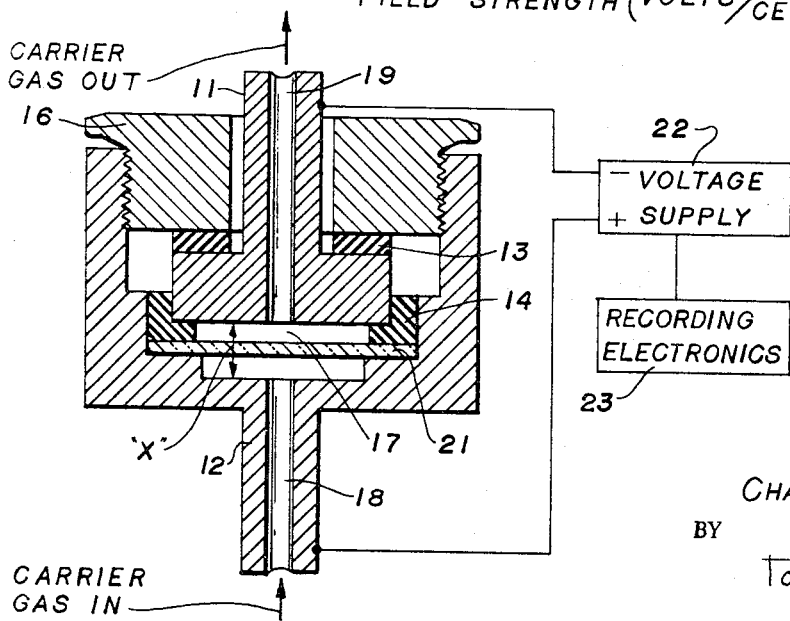

INVENTOR.
CHARLES H. HARTMANN
BY
Townsend and Townsend
ATTORNEYS

United States Patent Office 3,417,238
Patented Dec. 17, 1968

3,417,238
GAS CHROMATOGRAPHIC DETECTOR UTILIZING RADIOACTIVITY
Charles H. Hartmann, Moraga, Calif., assignor, by mesne assignments, to Varian Associates, Palo Alto, Calif., a corporation of California
Filed Apr. 6, 1965, Ser. No. 446,050
2 Claims. (Cl. 250—44)

ABSTRACT OF THE DISCLOSURE

A gas chromatographic detector in which the sample gas is ionized by metastable atoms of the carrier gas. An electric field strength in the range 2500 to 3800 volts per centimeter is maintained in the electrode gap. The high field strength increases the detector's sensitivity through a combination of avalanche excitation of the carrier gas atoms and acceleration of secondary electrons to energies sufficient to directly ionize sample gas atoms. Detector sensitivity is in the range 1 to 10 parts per billion of $O_2$, $CO_2$, and CO.

---

This invention relates to methods and apparatus for detecting gases. In particular, the invention relates to a method and apparatus wherein the gas to be detected is ionized in a region maintained at high electric field strength.

Gas chromatography is a method of analysis wherein a vaporized mixture of components is swept through a packed column by a stream of carrier gas. The components in the mixture are separated by the column according to their respective partition coefficients between the column packing and the carrier gas. After the separated components emerge from the column they are passed through a detector which produces an electrical signal proportional to the component concentration in the carrier gas. In this manner the original mixture is not only separated into its components but is quantitatively analyzed as well. The mixture or gas to be detected will hereinafter be referred to as the "sample gas" in order to distinguish it from the carrier gas.

One of the desirable characteristics of a gas chromatographic detector is that it have a high sensitivity, i.e., the detector should produce a usable electrical signal in response to minute concentrations of sample gas. Conventional detectors can detect sample gas concentrations on the order of 10 to 100 parts per billion. In particular, the most sensitive conventional detector, the so-called "argon detector" described by J. E. Lovelock, Journal of Chromatography, 1 (1958), pp. 35–46, has a lower detectable limit of 20 parts per billion of $CO_2$ in a helium carrier gas.

The present invention provides a method and apparatus capable of detecting sample gas concentrations in the range of 1 to 10 parts per billion. Thus, the present detector is at least ten times more sensitive than the most sensitive conventional detector. This extreme sensitivity sets the present detector apart from all prior devices and methods for detecting sample gases in the effluent from a gas chromatographic column.

Briefly, the high sensitivity is provided according to the present invention by establishing an unusually high electrical field strength within the detection zone. For example, the invention may be practiced by flowing a mixture of carrier and sample gases through an electrical field between electrodes of about 3,400 volts per centimeter of electrode spacing. As with prior detectors, the gas mixture is simultaneously irradiated by a suitable radiation source. Concentration of the sample gas is indicated by the magnitude of the ion current resulting from the interaction of the radiation and the high field strength on the gas mixture.

In the preferred embodiment helium is used as a carrier gas. Using a field strength of 3,400 volts per centimeter, and the preferred helium gas, 0.8 part of carbon dioxide per billion, 3 parts of carbon monoxide per billion, and 3 parts of oxygen per billion have been detected.

A significant departure in the construction of the present detector is found in the spacing of the electrodes. In the new detector the electrodes are spaced apart about 0.5 to 3.0 millimeters, and preferably about 1.0 millimeters. With this spacing a voltage source is applied to the electrodes so as to maintain a field strength of about 2,500 to 3,800 volts per centimeter of electrode spacing. Excellent results have been obtained where the field strength was maintained at about 3,400 volts per centimeter of electrode spacing.

Accordingly, it is an object of the invention to provide an improved method and apparatus for detecting gases.

Another object of the invention is to provide a gas chromatographic detector which is more sensitive than conventional ionization detectors.

Other objects and advantages of the invention will become apparent upon a consideration of the following specification, taken together with the accompanying drawings, in which:

FIG. 1 is a cross-sectional view of a detector employing a preferred parallel plate electrode geometry;

FIG. 2 is a graphical plot showing detector sensitivity as a function of the field strength within the electrode gap;

Figure 4:
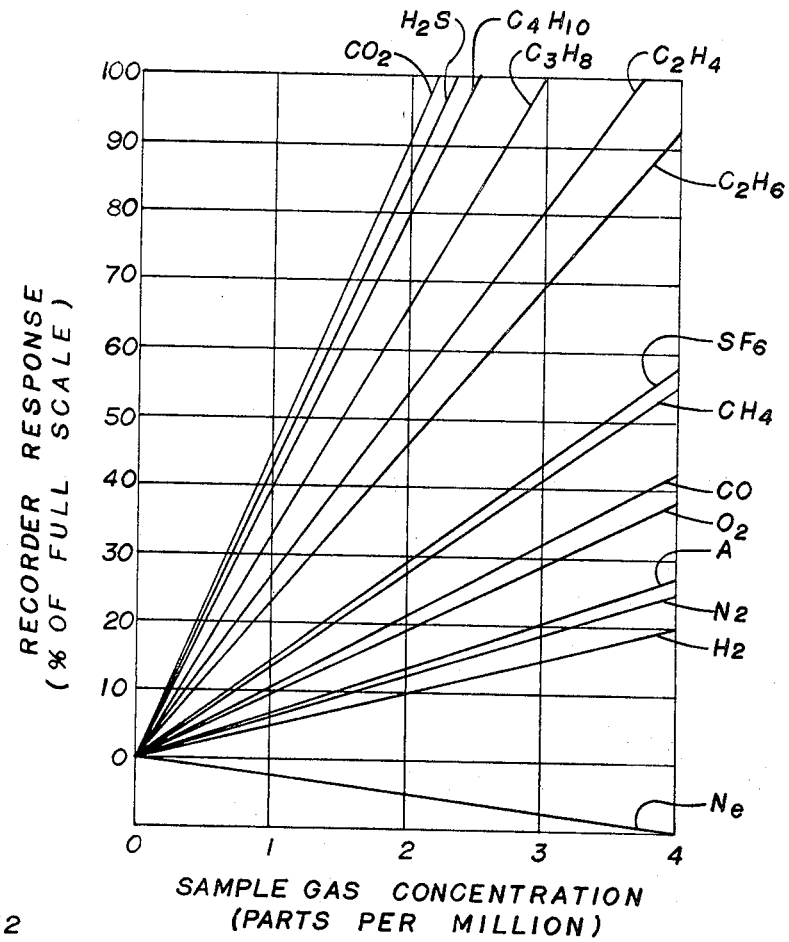
FIG. 4 is a graphic plot showing relative sensitivity of the detector to various gases and the detector response as a function of sample gas concentration.

The data shown in FIGS. 2 and 4 was obtained using helium as a carrier gas because it has been found that detector sensitivity is highest with helium; however, the method of the invention may be practiced using other gases, e.g., neon or argon, as carrier gas.

Referring now to FIG. 1, there are shown first and second electrodes 11 and 12 which are held in fixed space relation by insulating spacers 13 and 14 and threaded packing nut 16. Electrode 12 is internally recessed to form a sensing chamber 17 into which carrier gas flows through a bore 18 formed in electrode 12. Carrier gas leaves chamber 17 via a bore 19 formed in electrode 11. A radioactive source 21, preferably in the form of a thin metallic foil, is disposed across chamber 17. Although it may not be apparent from the figure, chamber 17 extends beyond the edge of foil 21 so that the carrier gas entering the chamber may flow around the edge of the foil and leave the chamber via bore 19. Electrodes 11 and 12 are connected to a voltage supply 22 and associated recording electronics 23. The design of such voltage supplies and recording electronics for measuring ion current is well known in the art, and is described in the book "Gas Chromatography" by A. B. Littlewood, Academic Press (1962), pp. 262–277. The distance between electrodes 11 and 12 across chamber 17 has been designated X for convenience in description, and will hereinafter be referred to as the electrode gap. Vertical dimensions within chamber 17 are exaggerated for clarity, and gap X is actually about 1 millimeter. The thickness of foil 21 is also exaggerated. The actual foil thickness is on the order of several thousandths of an inch.

One of the features which distinguishes the present invention from conventional detectors is the close electrode spacing (about one millimeter) which permits very high field strengths to be established in chamber 17. Although it has been found that detector sensitivity is critically dependent upon the magnitude of the field strength, the action of the field in producing the improved sensitivity is not altogether understood. However, it is believed that two separate modes of action occur simultaneously and account for the increased sensitivity. In the first action mode, primary electrons emitted by the radioactive source collide with carrier gas atoms and excite some of them to their metastable state (an excited atomic state having an unusually long lifetime, on the order of $10^{-3}$ seconds). The metastable carrier gas atoms collide, in turn, with sample gas atoms and an energy interchange occurs whereby the sample gas atoms are ionized and the excited carrier gas atoms are returned to their ground state. Secondary electrons produced by the ironization are accelerated by the electric field and acquire sufficient energy to excite additional carrier gas atoms to the metastable state. Thus, in this first mode of action, the electric field supplies kinetic energy to the secondary electrons, thereby producing an increased number of metastable carrier gas atoms and hence an increased ion current, i.e., increased detector sensitivity.

In the second mode of action, the electric field accelerates secondary electrons to energies sufficient to ionize sample gas atoms directly, without the intermediate step of creating metastable carrier gas atoms. This direct ionization of sample gas atoms by energetic secondary electrons also increases the ion current and hence the detector sensitivity.

The two modes of action discussed in the preceding paragraphs are given only as a plausible explanation of the detector's operation. There may be several other unknown collision mechanisms occurring simultaneously to account for the detector's remarkably high sensitivity, but these have not been investigated.

As mentioned previously, the critical step in the method of the present invention is the provision of a very high electric field strength in the sensing chamber of the detector. The relation of detector sensitivity to field strength is shown in FIG. 2, wherein the detector's relative sensitivity to an argon sample gas (in arbitrary units) is plotted as a function of field strength (in volts per centimeter) within the sensing chamber 17. The data in FIG. 2 was obtained with an electrode gap of one millimeter and helium as the carrier gas. It can be seen from FIG. 2 that the detector's sensitivity rises with increasing field strength to a constant level or "plateau" commencing at about 500 volts per centimeter. The sensitivity remains constant at this plateau until approximately 2500 volts per centimeter, at which point it rapidly rises in an exponential manner and asymptotically approaches a vertical axis corresponding to 3800 volts per centimeter. This axis is shown by a dotted line in FIG. 2 and has been designated as the sparking field strength. At this value of field strength a continuous spark discharge occurs across gap X and renders the apparatus useless as a detector. The operating range of the apparatus shown in FIG. 1 (using helium as a carrier gas) is designated as $\Delta E$ in FIG. 2. The upper limit of the operating range, i.e., the sparking field strength of 3800 volts per centimeter, corresponds to the field strength at which a continuous spark discharge occurs across gap X. The detector may be operated at any field strength within the $\Delta E$ range; however, it has been found that the electrical background noise rises with increasing field strength, so that at operating points close to the sparking field strength the electrical noise may be stronger than the desired signal. One solution to this problem is to decrease the field strength across the electrodes to the point where the signal to noise ratio is optimum. Alternatively, it is well known in the electrical communications art that a desired signal may be effectively filtered from a noisy background by a numerical averaging technique. Various signal "enhancers" are commercially available to accomplish this and may be incorporated into the recorder electronics 23 to increase the signal to noise ratio of the detector. This will permit operation of the detector at a field strength just below the sparking field strength, i.e., at maximum sensitivity. It will be understood that the data shown in FIG. 2, and in particular the critical $\Delta E$ operating region, pertains only to the detector using helium as a carrier gas. If another carrier gas, e.g., neon or argon, were used, the general shape of the sensitivity-field strength curve would be similar to that shown in FIG. 2; however, the critical $\Delta E$ range would be different.

One of the advantages of using small gap width on the order of one millimeter is that very high field strengths may be maintained within sensing chamber 17 with the application of only moderate voltages across electrodes 11 and 12. Thus, field strengths of 1000 to 5000 volts per centimeter may be maintained within chamber 17 using applied voltages of only 100 to 500 volts. A further advantage of small gap widths is that the volume of sensing chamber 17 is thereby significantly decreased, which correspondingly shortens the response time of the detector and makes it especially suitable for use with capillary chromatographic columns wherein carrier gas flow rates are on the order of only 1 ml./min. Also the short response time enables the apparatus to detect closely resolved chromatographic peaks.

It has been found that the field strength must be uniformly maintained across the electrode gap for proper performance of the detector. For this reason, the parallel plate electrode geometry shown in FIG. 1 is the preferred electrode placement, since it is relatively easy to maintain a uniform spacing between parallel plates. However, if care is taken to maintain uniform electrode spacing, the detector may be alternatively constructed using a coaxial electrode geometry as shown in FIG. 3.

Figure 3:
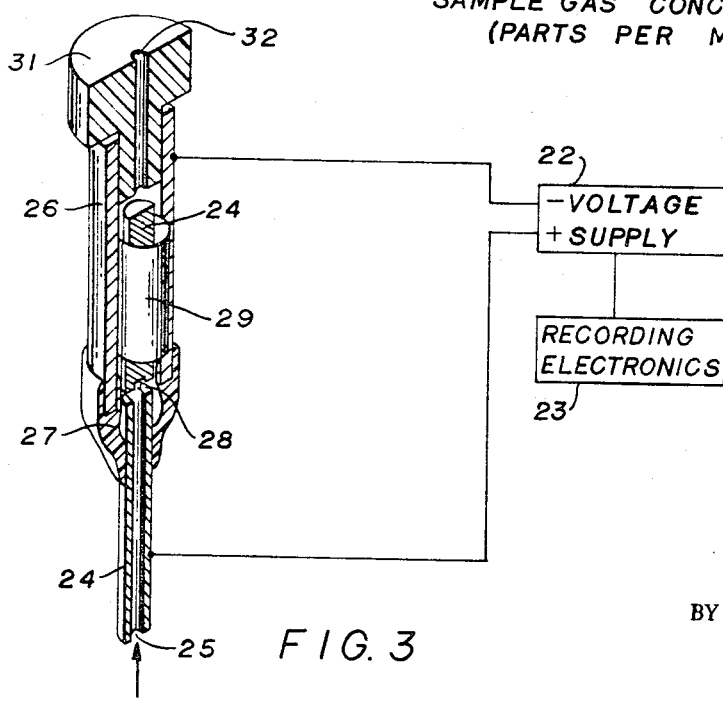
FIG. 3 is a cross-sectional view of a detector employing an alternative coaxial electrode geometry.

Referring now to FIG. 3, there are shown first and second coaxial electrodes 24 and 26 which are spaced and insulated from one another by a rigid insulating seal 27. An axial bore 25 extends partially through electrodes 24, and a plurality of transverse holes 28 communicate between bore 25 and the annulus between electrodes 24 and 26. A radioactive source 29, preferably in the form of a cylindrical metallic foil, is disposed in the narrow annulus between electrodes 24 and 26. This annulus corresponds to the electrode gap designated X in FIG. 1. Foil 29 is secured in position and is prevented from making electrical contact with electrode 24 by a snug friction fit against electrode 26. The internal bore of electrode 26 is closed off by an end gap 31 having a central bore 32. Electrodes 24 and 26 are connected to a voltage supply 22 and associated recording electronics 23.

In the operation of the apparatus shown in FIG. 3, carrier gas plus sample gas emerging from the chromatographic column enters the detector through bore 25, flows through holes 28, and fills the annulus between electrodes 24 and 26. Gas leaves the detector through bore 32. The gas within the electrode annulus is bombarded by electrons (or alpha particles) emitted by foil 29, and from this point on the operation of the coaxial geometry detector is similar to the operation of the parallel geometry detector shown in FIG. 1.

The construction materials for the detectors shown in FIGS. 1 and 3 are not critical. However, stainless steel is preferred because of its excellent corrosion resistance. Insulating spacers 13 and 14 are preferably made of Teflon (Dupont trademark for polytetrafluoroethylene) which has a very high dielectric strength and excellent mechanical characteristics. Radioactive foils 21 and 29 are preferably constructed from titanium with 100 to 250 millicuries of tritium adsorbed on the surface. The preparation and handling of such radioactive foils is well known in the detector art. Other radioactive emitters may be incorporated in the metallic foil but the electrode spacing and sensing volume must be accordingly adjusted to account for the change in ionizing power of the emitted particles.

The response of the detector to varying concentrations of different sample gases is shown in FIG. 4. These data were obtained using the apparatus in FIG. 1 and helium as a carrier gas. The sample gas concentration is given in units of parts per million, and the detector response is given as percentage of full scale deflection indicated by a potentiometric recorder measuring the detector output. It can be seen that the detector response is linear (and passes through zero) for all sample gases in the concentration range shown. Therefore, a calibration curve can be prepared for any sample gas of interest by merely measuring the detector output at a single concentration and connecting the plotted point to the origin with a straight line. It should be noted that neon is the only sample gas which gives a negative sloping line. This is probably explained by the fact that the ionization potential of neon (21.5 volts) in higher than the metastable excitation potential of helium (19.8 volts). Therefore, metastable helium atoms are unable to ionize neon atoms, and the ion concentration in the detector sensing volume is decreased when a neon sample gas passes therethrough. Consequently, the detector output as measured by the recorder shows a corresponding decrease, thus accounting for the negative sloping neon line.

A comparison of the sensitivity of the present detector with several conventional detectors is given in Table I. Sensitivities of the various detectors are presented in terms of the lowest detectable concentrations of various gases (expressed in parts per billion). It can be seen from Table I that the present detector is from 20 to 1000 times as sensitive as conventional detectors.

TABLE I.—LOWER DETECTABLE LIMITS

[In parts per billion]

| Sample gas | Present detector using helium | Argon detector using helium | Electron Drift-velocity detector | Coaxial Micro-ionization detector |
|---|---|---|---|---|
| $CO_2$ | 0.8 | 20 | 600 | 500 |
| CO | 3 | 60 | 600 | 1,000 |
| $O_2$ | 3 | 70 | 2,000 | 700 |
| $CH_4$ | 3.5 | 50 | 1,000 | 300 |
| $N_2$ | 15 | 200 | 200 | 3,000 |
| $H_2$ | 20 | 500 | 1,000 | 1,600 |

Although several embodiments of the invention have been shown and described, these are merely illustrative, and it is intended that the invention be limited solely by the scope of the following claims.

What is claimed is:

1. In a gas chromatographic detector of the type having two spaced apart electrodes, means for flowing gas between said electrodes, and a radiation source positioned so as to irradiate gas flowing between the electrodes, the improvement comprising,
    (a) means spacing said electrodes between 0.5 and 3 millimeters apart, and
    (b) a voltage source applied to said electrodes maintaining a nonfluctuating field strength of between 2,500 and 3,800 volts per centimeter of electrode spacing.

2. An apparatus for detecting gases, comprising in combination,
    (a) first and second electrodes in spaced apart relation,
    (b) means for flowing a mixture of a carrier gas and a sample gas between said electrodes,
    (c) means for radioactively irradiating said gas mixture in the space between said electrodes, and
    (d) means establishing and maintaining a nonfluctuating electrical field between said electrodes, the strength of said electric field being above 2,500 volts per centimeter and below the sparking field strength of said gas mixture.

References Cited

UNITED STATES PATENTS

| 3,046,396 | 7/1962 | Lovelock | 250—83.6 X |
| 3,104,320 | 9/1963 | Speakman et al. | 250—83.6 X |
| 3,154,680 | 10/1964 | Greene | 250—83.6 X |

ARCHIE R. BORCHELT, *Primary Examiner.*

U.S. Cl. X.R.

250—83.6